(12) United States Patent
Qing et al.

(10) Patent No.: US 11,010,600 B2
(45) Date of Patent: May 18, 2021

(54) FACE EMOTION RECOGNITION METHOD BASED ON DUAL-STREAM CONVOLUTIONAL NEURAL NETWORK

(71) Applicant: Sichuan University, Sichuan (CN)

(72) Inventors: Linbo Qing, Sichuan (CN); Songfan Yang, Sichuan (CN); Xiaohai He, Sichuan (CN); Qizhi Teng, Sichuan (CN)

(73) Assignee: Sichuan University, Sichuan (CN)

( * ) Notice: Subject to any disclaimer, the term of this patent is extended or adjusted under 35 U.S.C. 154(b) by 44 days.

(21) Appl. No.: 16/449,458

(22) Filed: Jun. 24, 2019

(65) Prior Publication Data
US 2019/0311188 A1 Oct. 10, 2019

(30) Foreign Application Priority Data
Dec. 5, 2018 (CN) .......................... 201811479488.5

(51) Int. Cl.
*G06K 9/00* (2006.01)
*G06K 9/62* (2006.01)
*G06N 3/08* (2006.01)
*G06N 3/04* (2006.01)

(52) U.S. Cl.
CPC ..... *G06K 9/00302* (2013.01); *G06K 9/00228* (2013.01); *G06K 9/6256* (2013.01); *G06K 9/6262* (2013.01); *G06N 3/04* (2013.01); *G06N 3/0445* (2013.01); *G06N 3/0454* (2013.01); *G06N 3/08* (2013.01)

(58) Field of Classification Search
CPC . G06K 9/00221–00315; G06K 9/6256; G06K 9/6262; G06K 9/6273; G06N 3/02–105; G06N 3/08–088; G06N 20/00; A61B 5/165
See application file for complete search history.

(56) References Cited

U.S. PATENT DOCUMENTS

| | | | |
|---|---|---|---|
| 10,679,041 B2* | 6/2020 | Cyrus | G06K 9/00281 |
| 2019/0180469 A1* | 6/2019 | Gu | G06T 13/40 |
| 2019/0347478 A1* | 11/2019 | Sorci | G06K 9/627 |

* cited by examiner

*Primary Examiner* — Vu Le
*Assistant Examiner* — Julius Chenjun Chai

(57) ABSTRACT

A face emotion recognition method based on dual-stream convolutional neural network uses a multi-scale face expression recognition network to single frame face images and face sequences to perform learning classification. The method includes constructing a multi-scale face expression recognition network which includes a channel network with a resolution of 224×224 and a channel network with a resolution of 336×336, extracting facial expression characteristics at different resolutions through the recognition network, effectively combining static characteristics of images and dynamic characteristics of expression sequence to perform training and learning, fusing the two channel models, testing and obtaining a classification effect of facial expressions. The present invention fully utilizes the advantages of deep learning, effectively avoids the problems of manual extraction of feature deviations and long time, and makes the method provided by the present invention more adaptable. Moreover, the present invention improves the accuracy and productivity of expression recognition.

4 Claims, 1 Drawing Sheet

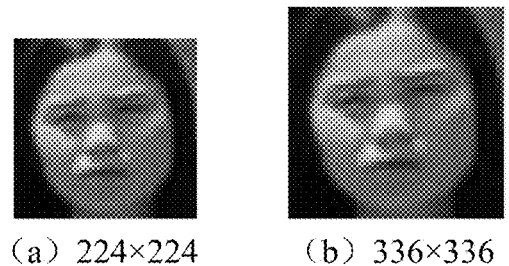
(a) 224×224   (b) 336×336
Fig. 1
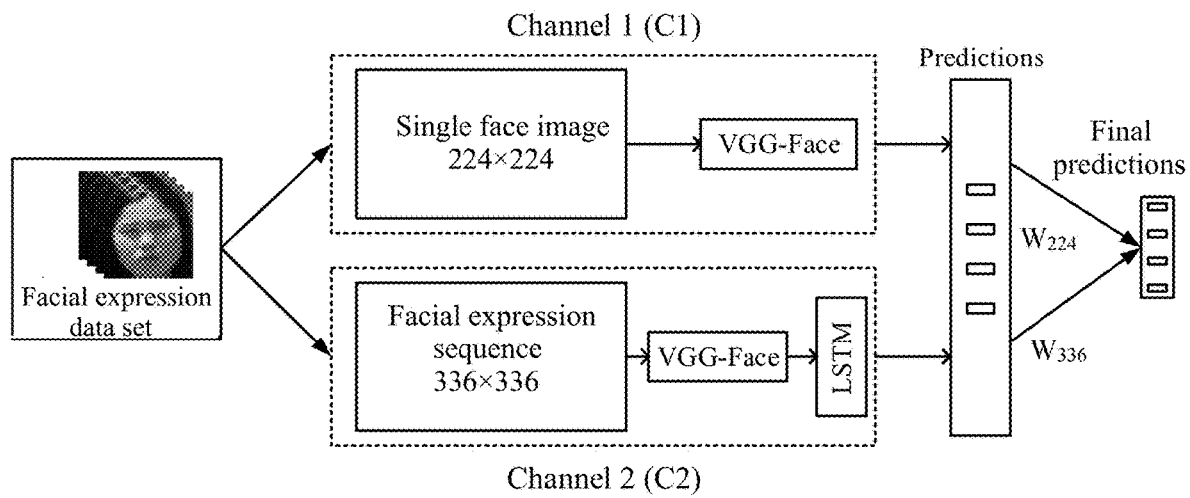
Fig. 2
| | | | | |
|---|---|---|---|---|
| bored | 0.69 | 0.00 | 0.09 | 0.22 |
| excited | 0.00 | 0.95 | 0.05 | 0.00 |
| frantic | 0.02 | 0.00 | 0.98 | 0.00 |
| relaxed | 0.00 | 0.00 | 0.07 | 0.93 |
| | bored | excited | frantic | relaxed |
Fig. 3

FACE EMOTION RECOGNITION METHOD BASED ON DUAL-STREAM CONVOLUTIONAL NEURAL NETWORK

CROSS REFERENCE OF RELATED APPLICATION

The present invention claims priority under 35 U.S.C. 119(a-d) to CN 201811479488.5, filed Dec. 5, 2018.

BACKGROUND OF THE PRESENT INVENTION

Field of Invention

The present invention relates to the problem of emotion recognition in the field of deep learning, and more particularly to a face emotion recognition method based on dual-stream convolutional neural network.

Description of Related Arts

As the most direct and effective expression of human emotional state, facial expression has always had important research significance. Facial expression recognition refers to separating a specific expression state from a given static image or a dynamic video sequence, and then determining an emotional state of a research object, realizing the recognition and understanding of the facial expression by the computer, and achieving human-computer interaction. At present, the application of facial expression recognition technology in the field of human-computer interaction mainly includes fatigue driving detection, real-time expression recognition on mobile phones, and social robots.

As an important research content in the field of computer vision, emotional recognition has received extensive attention from researchers at home and abroad. At present, the recognition of facial expressions includes expression recognition based on static images and expression recognition based on video sequences. The focus of facial expression analysis based on static images is to extract static expression features in a single facial expression image. For the expression sequence, the static and dynamic features of the sequence are combined to analyze the emotional state of people in the video. Currently, the use of these two methods for facial expression recognition has achieved a high recognition rate and generalization ability. Therefore, the present patent uses the single-frame static image of the facial expression data set and the information features of the expression sequence to perform face emotional recognition.

The traditional facial expression recognition method comprises a step of manually extracting facial features by hand, but the extracted facial features are single, the calculation process is complicated, and the applicable environment of the model is limited. Deep Learning is a research field that has attracted much attention in recent years. It combines multiple abstract data processing layers to form a computational model instead of the traditional method of manually selecting features, so that the machine is allowed to learn the features of data samples autonomously to effectively avoid shortcomings of the traditional method of manually selecting features. Moreover, compared with the traditional method of manually selecting features, the deep learning method uses a large amount of data to learn the features, and can provide a richer description of the feature information of the data. In short, deep learning is greatly improved compared to the traditional method, both in terms of recognition time and accuracy.

SUMMARY OF THE PRESENT INVENTION

An object of the present invention is to provide a face emotion recognition method based on dual-stream convolutional neural network, which combines deep learning with facial expressions in videos, and simultaneously introduces the dual-stream network structure for face emotion recognition for fully learning facial expression features, thereby effectively solving problems of difficulty in adjusting parameters of shallow learning at present, and low accuracy.

For the convenience of explanation, following concepts are firstly introduced.

CNN (Convolutional Neural Network) is designed by the visual nerve mechanism. It is a multilayer feedforward neural network, each layer comprises multiple two-dimensional planes, and each neuron on each plane works independently. The CNN comprises a feature extraction layer and a feature mapping layer.

LSTM (Long and Short Term Memory Network) is a time recursive neural network, which is specially designed for resolving chronic problems. It is adapted for handling and predicting important events with relatively long intervals and delays in the time series. It is a recurrent neural network.

Receptive field refers to the size of the mapped area of the pixel on the output feature map of each layer of CNN on the original image.

VGG16, VGG-Face: VGG16 is a mainstream convolutional neural network proposed by Oxford University in 2014, and it shows very good results in image classification and target detection tasks; VGG-Face is a face recognition network proposed by Oxford University.

Multi-scale face expression recognition network uses multiple parallel sub-neural networks to extract expression features of images at different resolutions, and then weights and fuses the multiple sub-neural networks to form a multi stream neural network model.

The present invention adopts a technical solution as follows.

The present invention provides a face emotion recognition method based on dual-stream convolutional neural network, which comprises:

(a) processing face sequences into images with two different resolutions;

(b) respectively training the images with the two resolutions through different convolutional neural networks; and (c) weighting and fusing the two channel networks in (b) mentioned above, and obtaining a multi-scale face expression recognition network model.

The method specifically comprises steps of:

(S1) defining all original facial expression sequences as a data set, dividing the data set into a training set, a verification set and a test set, and giving an emotional category for each original facial expression sequence;

(S2) obtaining a pretreated facial expression sequence through pretreating each original facial expression sequence in the data set, which comprises obtaining a face area of every image in the original facial expression sequence through face detection tracking, its and then cutting out a human face in the image, and then generating the pretreated facial expression sequence; and processing the pretreated facial expression sequence into two facial expression sequences with a resolution of 224×224 and 336×336;

(S3) introducing a two-channel (including a first channel and a second channel) facial expression recognition network based on CNN and LSTM, and respectively analyzing the two facial expression sequences with the resolution of 224×224 and 336×336, wherein: a last frame of the facial expression sequence with the resolution of 224×224 is inputted into the first channel, and the facial expression sequence with the resolution of 336×336 is inputted into the second channel; and (S4) respectively inputting the facial expression sequences with the two resolutions in the training set and the verification set into the first channel and the second channel, respectively obtaining a first channel model and a second channel model, fusing the first channel model and the second channel model, obtaining a fused model, testing the test set with the fused model, and finally obtaining an accuracy of the test set.

Beneficially effects of the present invention are as follows.

(1) The present invention fully carries forward the advantage of self-learning in deep learning, allows the machine to automatically learn image features, effectively avoids the deviation and inefficiency of artificially selected features, and has stronger adaptability.

(2) The present invention utilizes a multi-scale face image as an input of a network, so that the network learns characteristics of the multi-scale face image in different receptive fields, which effectively combines the complementary advantages of local characteristics and global characteristics, and improves the accuracy of the training effect.

(3) The present invention combines static features with dynamic features of an expression image by the dual-stream network structure, and then weights and fuses two channel networks, so that the final classification effect is improved.

(4) The present invention combines deep learning with video facial expression recognition to solve the problem that the accuracy of the traditional method is not high, so that the research value is improved.

BRIEF DESCRIPTION OF THE DRAWINGS

FIG. 1 is an example of receptive field which shows that images with different resolutions adopt a same convolution kernel according to a preferred embodiment of the present invention, wherein: (a) is an example of receptive field of an image with a resolution of 224×224, (b) is an example of receptive field of an image with a resolution of 336×336.

FIG. 2 is a schematic view of a face emotion recognition network based on dual-stream network.

FIG. 3 shows a confusion matrix on a test set which is obtained by fusing a C1 channel network model and a C2 channel network model with a ratio of 1:9.

DETAILED DESCRIPTION OF THE PREFERRED EMBODIMENT

The present invention will be further described in detail with accompanying drawings and embodiments as follows. It should be noted that the following embodiments are only used to further illustrate the present invention, and are not to be construed as limiting the protective scope of the present invention. Those skilled in the art will make some non-essential improvements and adjustments to the present invention based on the above-mentioned summary of the invention, which should still fall within the protective scope of the present invention.

Referring to FIG. 2, a face emotion recognition method based on dual-stream convolutional neural network comprises steps of:

(S1) Obtaining original facial expression sequences in a video through video analysis technology such as face detection tracking; attaching a corresponding emotion label for each original facial expression sequence, wherein the emotion label comprises bored label, excited label, frantic label and relaxed label; defining all original facial expression sequences as a data set; and then dividing the data set into a training set, a test set, and a verification set according to a ratio of 8:1:1;

(S2) processing every original facial expression sequence in the data set through face detection technology, and obtaining two different processed facial expression sequences with two different resolutions corresponding to every original facial expression sequence, wherein the two resolutions are respectively 224×224 and 336×336;

(S3) processing the facial expression sequences with the two different resolutions obtained by the step of (S2) through two different network channels, wherein a last frame of the facial expression sequence with the resolution of 224×224 is inputted into a first channel C1, and the facial expression sequence with the resolution of 336×336 is inputted into the second channel C2, VGG16 is used as a basic network of the C1, VGG-Face+LSTM is a basic network of the C2; weighting and fusing the C1 and the C2 with a ratio of 1:9; and obtaining a multi-scale face sequence expression recognition network;

(S4) training the multi-scale face sequence expression recognition network through the training set and the verification set in the step of (S1), wherein: the C1 is directly trained to obtain a first channel model; CNN (Convolutional Neural Network) of the C2 is firstly trained, and then LSTM of the C2 is trained with characteristics extracted by the CNN to obtain a second channel model;

(S5) respectively inputting the verification set with the two different resolutions in the step of (S1) into the C1 and the C2, and predicting a model performance of the C1 and the C2; and (S6) weighting and fusing the first channel model and the second channel model respectively obtained by the two channels C1 and C2 with a ratio of 1:9, obtaining a fused model, and then verifying a performance of the fused model through the verification set.

What is claimed is:

1. A face emotion recognition method based on dual-stream convolutional neural network, which comprises steps of:

(S1) defining all original facial expression sequences as a data set, dividing the data set into a training set, a verification set and a test set, and giving an emotional category for each original facial expression sequence, wherein proportions of the training set, the verification set and the test set in the data set are 80%, 10% and 10%, respectively;

(S2) obtaining a pretreated facial expression sequence through pretreating each original facial expression sequence in the data set, which comprises obtaining a face area of every image in the original facial expression sequence through face detection tracking, and then cutting out a human face in the image, and then generating the pretreated facial expression sequence; and processing the pretreated facial expression sequence into two facial expression sequences with a resolution of 224×224 and 336×336;

(S3) introducing a two-channel including a first channel and a second channel facial expression recognition network based on CNN (Convolutional Neural Network) and LSTM (Long and Short Term Memory Network), and respectively analyzing the two facial expression sequences with the resolution of 224×224 and 336×336, wherein: the last frame of the facial expression sequence with the resolution of 224×224 is inputted into the first channel, and the facial expression sequence with the resolution of 336×336 is inputted into the second channel; and (S4) respectively inputting the facial expression sequences with the two resolutions in the training set and the verification set into the first channel and the second channel, respectively obtaining a first channel model and a second channel model, fusing the first channel model and the second channel model, obtaining a fused model, testing the fused model with the test set, and finally obtaining an accuracy of the test set.

2. The face emotion recognition method, as recited in claim 1, wherein: the emotional category comprises bored, excited, frantic and relaxed.

3. The face emotion recognition method, as recited in claim 1, wherein: in the step of (S3), VGG16 is used as a basic network of the first channel, VGG-Face+LSTM is a basic network of the second channel for respectively learning static characteristics and dynamic characteristics of expression images at different resolutions.

4. The face emotion recognition method, as recited in claim 1, wherein: in the step of (S4), the first channel model and a second channel model are weighted and fused with a ratio of 1:9 to obtain a multi-scale face expression recognition network for facial expression recognition.

* * * * *